United States Patent [19]
Newton

[11] Patent Number: 5,497,961
[45] Date of Patent: Mar. 12, 1996

[54] GAS TURBINE ENGINE NACELLE ASSEMBLY

[75] Inventor: Arnold C. Newton, Derby, England

[73] Assignee: Rolls-Royce plc, London, England

[21] Appl. No.: 185,906

[22] PCT Filed: Jun. 3, 1992

[86] PCT No.: PCT/GB92/00994

§ 371 Date: Jan. 21, 1994

§ 102(e) Date: Jan. 21, 1994

[87] PCT Pub. No.: WO93/02920

PCT Pub. Date: Feb. 18, 1993

[30]  Foreign Application Priority Data

Aug. 7, 1991 [GB] United Kingdom ............ 9116986

[51] Int. Cl.$^6$ ............................................. B64D 29/00
[52] U.S. Cl. ........................................ 244/54; 248/555
[58] Field of Search .......................... 244/54, 53 R; 248/554, 555; 60/39, 31

[56]  References Cited

U.S. PATENT DOCUMENTS

| | | |
|---|---|---|
| 2,863,620 | 12/1958 | Vautier . |
| 3,561,707 | 2/1971 | Strock ................................. 248/554 |
| 3,848,832 | 11/1974 | Stanley et al. ........................ 244/54 |
| 3,979,087 | 9/1976 | Boris et al. ........................... 244/54 |
| 4,013,246 | 3/1977 | Nightingale .......................... 244/54 |
| 4,266,741 | 5/1981 | Murphy ................................ 244/54 |
| 4,603,821 | 8/1986 | White ................................... 244/54 |

FOREIGN PATENT DOCUMENTS 1471132  1/1967  France .

*Primary Examiner*—Andres Kashnikow
*Attorney, Agent, or Firm*—Cushman Darby & Cushman

[57]  ABSTRACT

A gas turbine engine nacelle assembly (10) comprises a pylon (13) for mounting the assembly on an aircraft, a nacelle (11) and a gas turbine engine (12) enclosed within the nacelle (11). Part (15) of the nacelle (11) is structurally integral with the pylon (13) and has the remainder of the nacelle (11) attached to it. The nacelle part (15) additionally provides at least partial support for the gas turbine engine (12). The arrangement provides weight savings.

11 Claims, 2 Drawing Sheets

GAS TURBINE ENGINE NACELLE ASSEMBLY

FIELD OF THE INVENTION

This invention relates to a gas turbine engine nacelle assembly.

BACKGROUND OF THE INVENTION

A convenient and common way of mounting a gas turbine engine on an aircraft is to suspend the engine from a pylon mounted on the underside of the aircraft's wing. For reasons of aerodynamic efficiency, the engine is enclosed in a nacelle; large holes being provided at the ends of the nacelle to respectively accommodate the engine air inlet and exhaust nozzle.

Typically, the engine is attached to the pylon and the nacelle is mounted either from the engine or directly from the pylon. In either arrangement, the nacelle intake and final nozzle portions are directly attached to the engine. This results in loads being imposed upon the engine's casing which are additional to those which result from normal engine operation. As a consequence the engine's casings have to be made stronger, and therefore heavier, than would otherwise be the case.

In GB2046193A there is disclosed a gas turbine engine installation in which the nacelle, rather than the engine which it contains, supports the engine air inlet and exhaust systems. The nacelle is divided into upper and lower parts, both of which provide engine support. The lower nacelle part is adapted to pivot away from the upper part to provide engine access. However to achieve this, the interconnections between the lower cowling part and the engine have to be disconnected. This prolongs and complicates the process of engine access and removal. Moreover, the interconnections between the engine and nacelle, particularly those at the rearward end of the engine, tend to obstruct air flow if the gas turbine engine is of the ducted fan type.

SUMMARY OF THE INVENTION

It is an object of the present invention to provide an improved gas turbine engine nacelle assembly.

According to the present invention, a gas turbine engine nacelle assembly suitable for mounting on an aircraft comprises a pylon for the attachment of said assembly to said aircraft, a gas turbine engine and a nacelle, said nacelle enclosing said gas turbine engine and comprising, in axial flow series, an air intake, a mid-portion and a final nozzle, said nacelle mid-portion comprising an upper part which is structurally integral with said pylon, and a lower part which is attached to said upper part, said nacelle mid-portion upper part supporting said air intake, said final nozzle and at least part of the forward end of said gas turbine engine, the rearward end of said end gas turbine engine being directly supported by said pylon.

In such a gas turbine engine nacelle assembly, the gas turbine engine does not carry any significant nacelle portions and therefore may be of lighter construction than has heretofore been the case.

BRIEF DESCRIPTION OF THE DRAWINGS

The present invention will now be described, by way of example, with reference to the accompanying drawings in which.

DETAILED DESCRIPTION OF THE INVENTION

Figure 1:
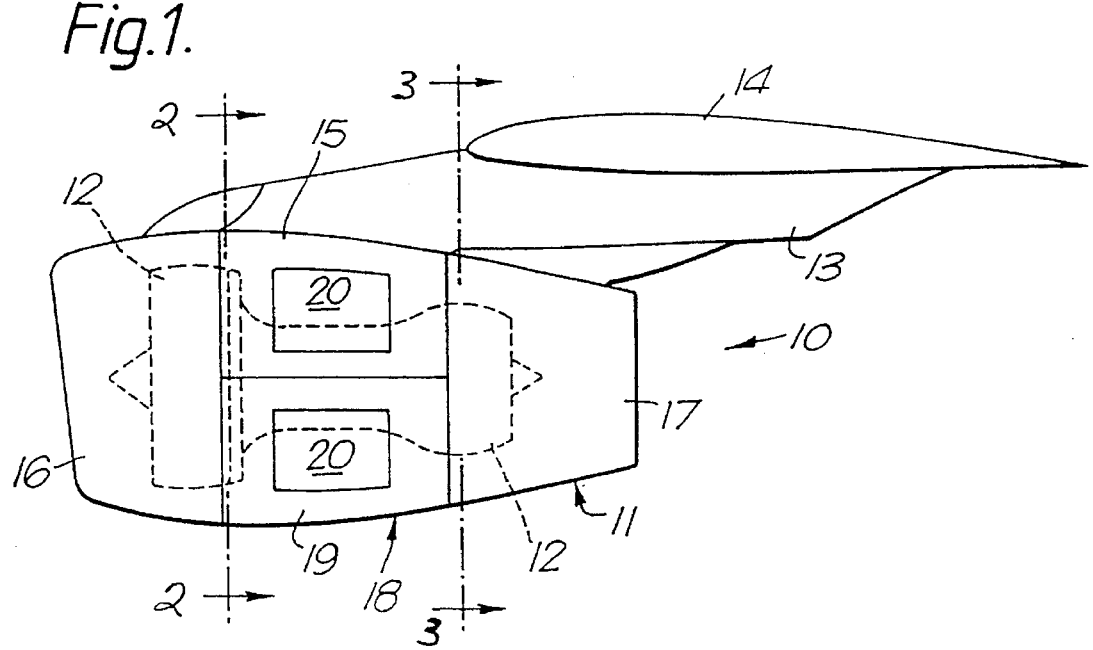
FIG. 1 is a side view of a gas turbine engine nacelle assembly in accordance with the present invention.

Referring to FIG. 1, a gas turbine engine nacelle assembly generally indicated at 10 comprises a nacelle 11, a gas turbine engine 12 (shown in interrupted lines) and a pylon 13. The pylon 13 supports the assembly 10 from an aircraft wing 14. It will be appreciated however that the pylon 13 could, if so desired, be so configured as to support the assembly 10 directly from an aircraft fuselage. The ducted fan gas turbine engine 12, which is enclosed by the nacelle 11, is of conventional configuration. It will not, therefore, be described in any further detail.

The pylon 13 is likewise of generally conventional configuration. However a part 15 of the nacelle 11 is structurally integral with the pylon 13. Specifically the nacelle part 15 is a part of the upper half of the nacelle 11 which is located in the mid-region of the nacelle 11. It is of inverted generally u-shaped cross-section and interconnects the fully annular parts 16 and 17 of the nacelle 11 which define the intake and final nozzle of the nacelle. The nacelle intake 16 and nozzle 17 are attached to the nacelle part 15 by conventional bolted joints thereby ensuring their simple detachment when required.

Figure 4:
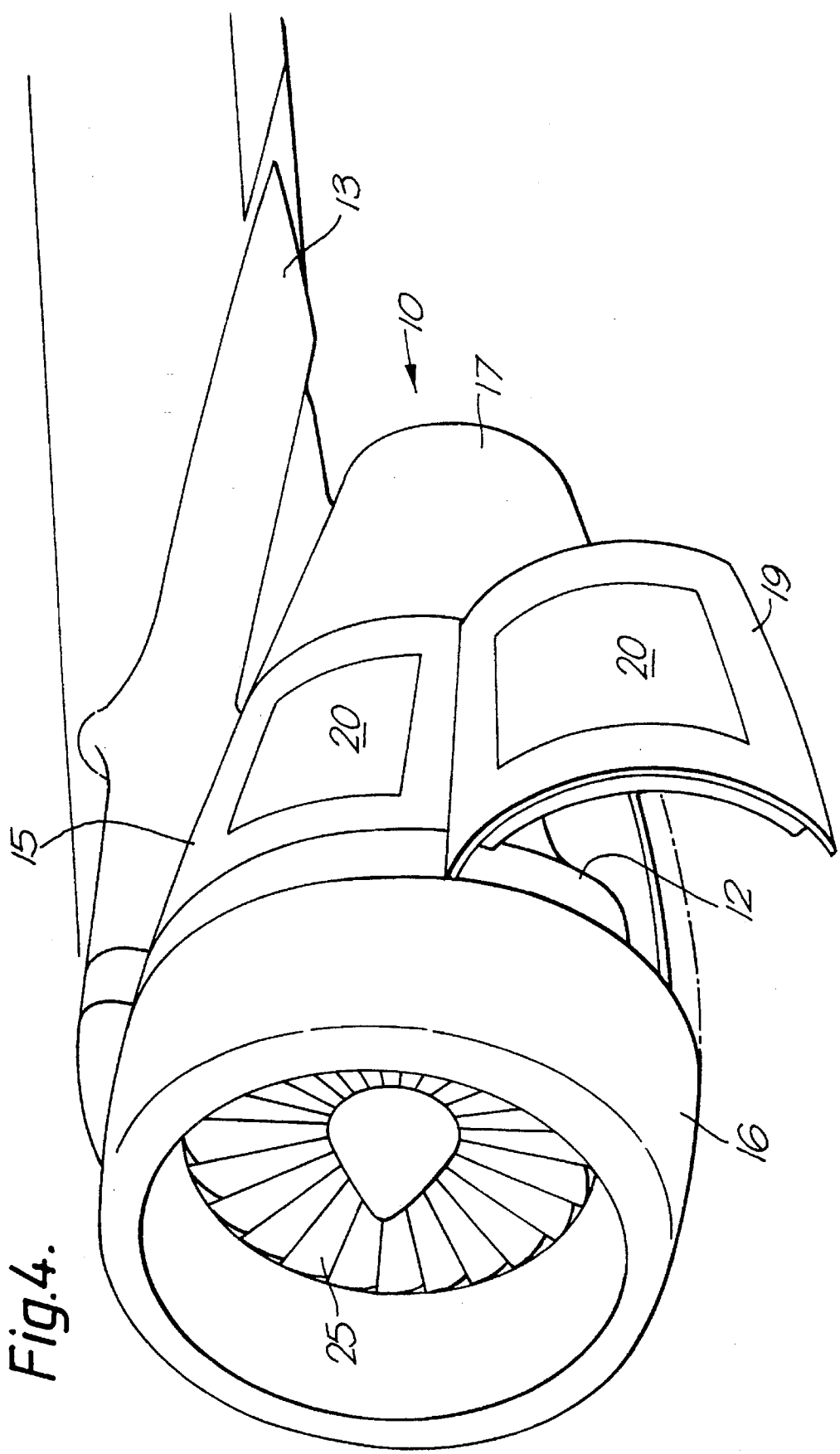
FIG. 4 is a perspective view of the gas turbine engine nacelle assembly of FIG. 1 showing how part of the nacelle is pivotally mounted on a further portion of the nacelle to provide access to the gas turbine engine.

The lower half 18 of the nacelle 11 immediately below the nacelle part 15 is interposed between, but is not attached to the nacelle intake 16 and nozzle 17. The lower nacelle half 18 is constituted by two similar access doors 19, one of which can be seen in FIGS. 1 and 4. Each access door 19 is pivotally attached to the nacelle part 15 so that it can be pivoted away from the remainder of the nacelle 11, as can be seen in FIG. 4, to provide maintenance access to the ducted fan gas turbine engine 12. However during normal operation of the engine 12, the access doors 19 are latched together to cooperate with the nacelle part 15, the intake 16 and exhaust nozzle 17 to define the smooth aerodynamically efficient exterior shape of the nacelle 11.

Each of the access doors 19 and the nacelle part 15 is provided with pivotable flaps 20. During normal operation of the gas turbine engine 12, the flaps 20 block correspondingly shaped apertures in the nacelle part 15 and the access doors 19. However when reverse thrust of the engine 12 is required for braking purposes, the flaps 20 pivot open. They pivot in such a way as to divert at least some of the fan by-pass air passing through the engine 12 in a generally forwards direction.

It will be seen therefore that all of nacelle 11 is either directly or indirectly carried by the pylon 13; the nacelle part 15 being structurally integral with the pylon 13 while the remainder of the nacelle 11 is carried by the nacelle part 15. None of the nacelle 11 is carried by the gas turbine engine 12.

The gas turbine engine 12 is supported within the nacelle 11 at four locations: one at the rear of the engine and three at the front.

Figure 3:
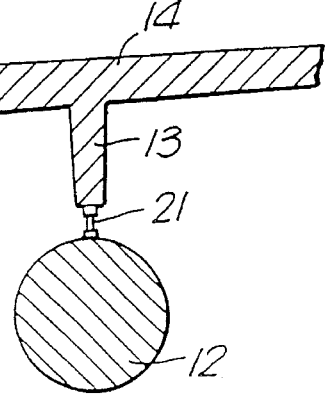
FIG. 3 is a view on section line 3—3 of FIG. 2.

The rear engine mounting 21 can be seen in FIG. 3. It is of conventional configuration and interconnects the turbine casing of the engine 12 and the pylon 13. The mounting 21 is of the type which may be intended primarily to carry vertical loads only and is therefore of slim construction. Consequently since it is partially located in fan exhaust duct of the engine 12, it has less of a detrimental effect upon the fan air flow than would be the case with a thicker conventional mounting adapted to carry thrust, side and torque loads.

Figure 2:
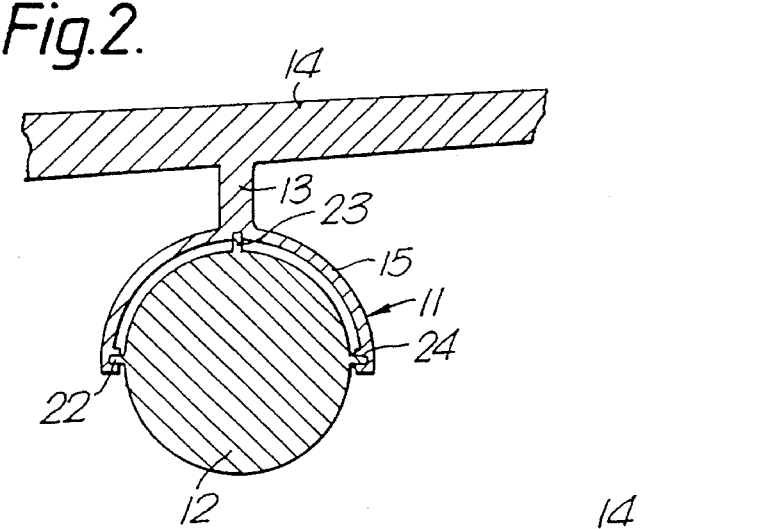
FIG. 2 is a view on section line 2—2 of FIG. 1.

The front of the engine 12 is supported by three mountings 22,23 and 24 which can be seen in FIG. 2. The mountings 22 and 24 are located in a horizontal plane containing the longitudinal axis of the engine 12 and interconnect the fan casing of the fan engine 12 with the nacelle part 15. The mounting 23 is located at the top of the fan casing and interconnects the fan casing with the pylon 13. The fan casing is the largest diameter part of the engine 12 and surrounds the engines fan blades 25, visible in FIG. 4.

All of the engine mountings 22,23 and 24 are of the same general type. Essentially they comprise a generally cylindrical peg feature on the fan casing which engages in a corresponding reception feature in the nacelle part 15 or the pylon in the case of the mounting 23 as the case may be.

The upper front mounting 23 will primarily carry side loads due to its location. However, the front side mountings 22 and 24 are adapted to carry a combination of vertical, thrust and torque loads.

It will be seen therefore that the nacelle part 15 provides the majority of the support of the engine 12 while the pylon 13 provides the remainder of the support. The nacelle part 15 additionally supports the remainder of the nacelle 18.

The advantages which a gas turbine engine nacelle assembly in accordance with the present invention provides are:

(a) The nacelle intake 16 loads encountered during flight are not carried directly by the gas turbine engine 12 fan casing. Consequently the fan casing can be made lighter, and greater stability of the clearances between the fan casing and the rotating fan blades which it surrounds can be achieved.

(b) The manner in which the gas turbine engine 12 is supported eliminates the bending imposed upon the engine as a result of the thrust which it produces.

(c) Attachment of the nacelle intake 16 to the remainder of the nacelle allows accurate control of the incidence of the nacelle 16. This is because the intake nacelle 16 is not affected by movement of the engine 12.

(d) The nacelle nozzle 17 loads are not carried directly by the casing of the engine 12. Consequently the nozzle and turbine region of the engine 12 can be made lighter.

(e) Since they are interconnected by the nacelle part 15, the axially forward loads of the nacelle intake 16 are to a certain extent, countered by the axially rearward loads of the nacelle nozzle 17.

(f) When the flaps 20 are opened to provide reverse thrust, they do not impose loads directly upon the engine 12.

I claim:

1. A gas turbine nacelle assembly (10) suitable for mounting on an aircraft comprising a pylon (13) for the attachment of said assembly (10) to said aircraft, a gas turbine engine (12) and a nacelle (11), said nacelle (11) enclosing said gas turbine engine (12) and comprising, in axial flow series, an air intake (16), a mid-portion (15,19) and a final nozzle (17) characterised in that said nacelle mid-portion (15,19) comprises an upper part (15) which is structurally integral with said pylon (13) and a lower part (19) which is attached to said upper part (15), said nacelle mid-portion upper part (15) supporting said air intake (16), said final nozzle (17) and at least part of the forward end of said gas turbine engine (12), the rearward end of said gas turbine engine (12) being directly supported by said pylon.

2. A gas turbine engine nacelle assembly as claimed in claim 1 characterised in that said nacelle mid-portion upper part (15) structurally integral with said pylon (13) is of inverted generally U-shaped cross-section.

3. A gas turbine engine nacelle assembly as claimed in claim 1 or claim 2 characterised in that the lower part (19) of said nacelle mid-portion (15,19) comprises access doors (19) which are pivotally attached to said nacelle mid-portion upper part (15).

4. A gas turbine engine nacelle assembly as claimed in claim 3 characterised in that said access doors (19) and said nacelle mid-portion upper part (15) structurally integral with said pylon (13) are provided with pivotable flaps (20) to selectively divert at least some of the propulsive thrust of said gas turbine engine (12) in a generally forward direction to provide engine braking.

5. A gas turbine engine nacelle assembly as claimed in claim 1 wherein the forward end of said gas turbine engine (12) is at least partially supported from said upper part (15) of said nacelle mid-portion (15,19) at positions (22,24) which lie in a longitudinal plane containing the longitudinal axis of said gas turbine engine (12).

6. A gas turbine engine nacelle assembly as claimed in claim 5 characterised in that said positions (22,24) of said direct attachment are adapted to transfer a combination of vertical, thrust and torque loads between said gas turbine engine (12) and said upper part (15) of said nacelle mid-portion (15,19).

7. A gas turbine engine nacelle assembly as claimed in claim 1 wherein said gas turbine engine (12) is of the ducted fan type.

8. A gas turbine engine nacelle assembly as claimed in claim 1 wherein said rearward end of said gas turbine engine has an engine support supporting said engine from said pylon for carrying at least vertical loads.

9. A gas turbine engine nacelle assembly as claimed in claim 1 wherein said engine has a forward end which is supported directly from said pylon by a support which interconnects said forward end and said pylon directly.

10. A gas turbine engine nacelle assembly as claimed in claim 1 wherein said gas turbine engine has an upstream end which is supported directly from said pylon with a support adapted to carry primarily side loads.

11. A gas turbine engine nacelle assembly for mounting on an aircraft comprising a pylon for the attachment of said assembly to an aircraft, a nacelle for housing and enclosing a gas turbine engine of the type having in axial flow series, an air intake, a mid-portion and a final nozzle, said nacelle having a mid-portion comprising a first part which is structurally integral with said pylon and a second part which is attached to said first part, said nacelle including an engine support for supporting the air intake of a gas turbine engine and the final nozzle of a gas turbine engine, said nacelle assembly including a support for engaging and directly supporting the rearward end of the gas turbine engine.

* * * * *